March 23, 1954  F. A. WAGNER  2,672,856

ENGINE VALVE SEAT INSERT

Filed Feb. 5, 1951

INVENTOR.
Frederick A. Wagner
BY
Atty.

Patented Mar. 23, 1954

2,672,856

UNITED STATES PATENT OFFICE 2,672,856

ENGINE VALVE SEAT INSERT

Frederick A. Wagner, Livermore, Calif.

Application February 5, 1951, Serial No. 209,432

3 Claims. (Cl. 123—188)

This invention relates to removable valve seat rings for internal combustion engine poppet valves or what are known as "valve seat inserts" and the pricipal object of the invention is to provide a method and means for securing such valve seat rings in place in a recess formed in the engine block or other adjacent part thereof, yet permitting removal and replacement when worn.

Specific advantages of the invention will appear in the following description and accompanying drawings.

I am familiar with many attempts to accomplish the above objective and many patents already issued on the subject, but I do not know of any which is as simple and effective as the present development.

Briefly stated, my method comprises beveling the outer side of the valve ring, forming a recess in the block of a size somewhat larger than the ring and threaded interiorly, and screwing an exteriorly threaded and interiorly beveled wedge ring into the recess against the outer beveled side of the valve ring seated in the recess, the outer or wedge ring being of a thickness to just clear the bottom of the recess when screwed very tightly into the recess.

In the drawings

Figure 3:
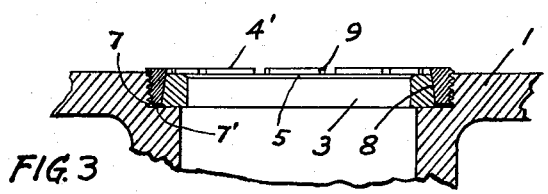
Fig. 3 is a cross section similar to that of Fig. 1 but showing a modified wedge ring.

In further detail the parts shown in the drawing are the engine block 1, gas or fuel passage 2, valve ring 3, wedge ring 4, and 4' for Fig. 3.

The valve seat ring may be of any approved metal, usually some very hard and wear resistant alloy such as Stellite, and it may be a perfectly plain flat ring with the usual upper inner corner beveled off to form the seat as at 5.

The wedge ring is preferably made of rolled or drawn brass or bronze for strength and heat conductivity as well as ease of manufacture, and is threaded exteriorly as at 6 with a relatively fine thread (about 24 per inch is found satisfactory for a ring of about 2¼ inches in diameter), and of course the recess 7 in the engine part is threaded to match and provide an easy fit to start as it will tighten up as the wedge ring is screwed down.

The inner beveled surface of the wedge ring and matching outer beveled surface of the valve seat ring are indicated at 8. The wedge ring is preferably about twice the height of the valve ring and formed with a plurality of wrench notches 9 extending radially across it to provide for a round or tubular ended wrench complementally notched to engage several of the ring notches simultaneously in screwing the wedge ring tightly in place and after which the projecting portion of the wedge ring may be trimmed off.

As it is desirable to keep the block recess as small as possible it is also desirable to keep the inner edge of the wedge ring quite thin so that it is very little greater in outside diameter than the diameter of the valve ring, as will be observed from the drawing, but as the wedge ring becomes increasingly thicker toward the top, the upper extended portion provides for sufficiently deep wrench notches and also a great deal of extra body strength for screwing the ring as tightly as is required, and it may be noted that in practice a five foot hand lever bar was used for the purpose, for the metal must be compressed sufficiently to always compensate for thousands of coolings after being highly heated, and with the wrench as described this has been definitely proven to have been accomplished.

The thickness of the wedge ring at the lower end should be preferably such as to insure a slight clearance of the bottom of the recess when screwed in with the required pressure, as shown at 7'.

Trimming off the surplus wrench gripping stock from the wedge ring may be avoided by making the threaded recess somewhat larger in diameter and the wedge ring thicker and of a height to come flush or substantially flush with the top of the valve ring when screwed "home" as indicated in Fig. 3 and wherein the wrench notches may extend into the wedge ring slightly below the top of the valve ring if desired.

Figure 2:
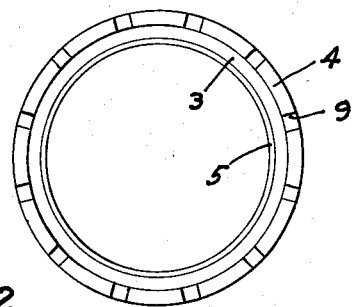
Fig. 2 is a plan view of the assembly of Fig. 1.
Figure 1:
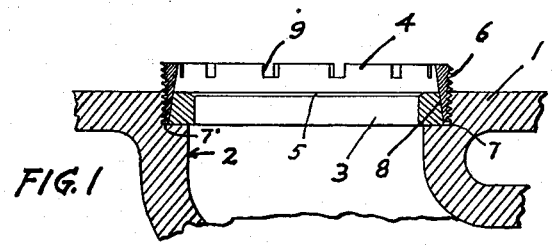
Fig. 1 is a cross section of an engine fuel or gas passage showing the valve ring in the recess and the wedge ring screwed in place before trimming off the wedge ring.

If the wrench notches are trimmed off as contemplated for the showing of Fig. 1 the ultimate removal of the worn valve seat ring may be done by breaking it away with a sharp blow and after which the wedge ring can easily be removed, and this is facilitated by having the valve ring overhang the engine gas passage 2 as shown in Fig. 1, but with the arrangement shown in Fig. 3, it is possible to unscrew the wedge ring after applying a penetrating oil.

I am aware of locking rings having been forced back of valve rings as by caulking, driving in by great pressure, and being spot welded in place, but the simple threading on a wedge ring in the manner herein shown overcomes all the difficulties of insertion or removal heretofore encountered and is a new and valuable improvement thoroughly proven out by rigorous tests on heavy duty engines.

Having thus described my improvements in engine valve seat inserts what I claim is:

1. In an engine valve seat insert assembly comprising a ring seat member disposed within a recess in an engine member surrounding a passageway, the improvement which comprises said ring seat member exteriorly tapered outwardly from top to bottom, said recess threaded interiorly, and a wedge ring threaded to screw into said recess and interiorly tapered from top to bottom to embrace the tapered exterior of said ring seat member.

2. In an engine valve seat insert assembly comprising a ring seat member disposed within a recess in an engine member surrounding a passageway, the improvement which comprises said ring seat member exteriorly tapered outwardly from top to bottom, said recess threaded interiorly, and a wedge ring threaded to screw into said recess and interiorly tapered from top to bottom to embrace the tapered exterior of said ring seat member extending outward above said ring seat member and provided with wrench engaging devices on its outer edge adapted to be faced off flush with the top of the ring seat member.

3. In an engine valve seat insert assembly comprising a ring seat member disposed within a recess in an engine member surrounding a passageway, the improvement which comprises said ring seat member exteriorly tapered outwardly from top to bottom, said recess threaded interiorly, and a wedge ring threaded to screw into said recess and interiorly tapered from top to bottom to embrace the tapered exterior of said ring seat member, said wedge ring being of a length axially substantially greater than that of the ring seat member to extend outwardly above said ring seat member when screwed in place.

FREDERICK A. WAGNER.

References Cited in the file of this patent

UNITED STATES PATENTS

| Number | Name | Date |
|---|---|---|
| 1,080,430 | Ferrell et al. | Dec. 2, 1913 |
| 1,724,036 | Mooers | Aug. 13, 1929 |
| 1,958,004 | Jehle | May 8, 1934 |
| 2,112,232 | Stoll | Mar. 29, 1938 |
| 2,447,858 | Hoern | Aug. 24, 1948 |

FOREIGN PATENTS

| Number | Country | Date |
|---|---|---|
| 201,869 | Great Britain | Aug. 9, 1923 |
| 380,608 | Great Britain | Sept. 22, 1932 |